United States Patent
Lee et al.

(10) Patent No.: US 7,594,410 B2
(45) Date of Patent: Sep. 29, 2009

(54) METHOD OF CONTROLLING AIR CONDITIONER FOR VEHICLES

(75) Inventors: Jeong-Hoon Lee, Daejeon-si (KR); Tae-Eun Kim, Daejeon-si (KR)

(73) Assignee: Halla Climate Control Corp., Daejeon-si (KR)

( * ) Notice: Subject to any disclaimer, the term of this patent is extended or adjusted under 35 U.S.C. 154(b) by 495 days.

(21) Appl. No.: 11/253,789

(22) Filed: Oct. 20, 2005

(65) Prior Publication Data
US 2006/0086117 A1      Apr. 27, 2006

(30) Foreign Application Priority Data

Oct. 21, 2004  (KR) .................. 10-2004-0084275
Oct. 13, 2005  (KR) .................. 10-2005-0096325

(51) Int. Cl.
 *F25B 1/00*   (2006.01)
 *F25B 49/00*  (2006.01)

(52) U.S. Cl. ..................... 62/228.3; 62/228.1

(58) Field of Classification Search ............... 62/228.1, 62/228.3, 229, 133; 236/78 D
See application file for complete search history.

(56) References Cited

U.S. PATENT DOCUMENTS 4,893,480 A    1/1990 Matsui et al.
6,038,871 A    3/2000 Gutierrez et al.
2004/0050084 A1  3/2004 Fukumi et al.

FOREIGN PATENT DOCUMENTS

| DE | 101 29 290 | | 4/2002 |
| EP | 1 004 463 | | 5/2000 |
| JP | 03005233 A | * | 1/1991 |
| JP | 2003200730 A | * | 7/2003 |

* cited by examiner

*Primary Examiner*—Chen-Wen Jiang
(74) *Attorney, Agent, or Firm*—Lowe Hauptman Ham & Berner LLP

(57) ABSTRACT

A vehicle air conditioner is controlled to a target control value that controls a swash-plate control value of a swash-plate variable capacity compressor. The variable control is based on temperature deviation between target evaporator temperature and actual evaporator temperature, to control compressor discharge capacity. A target evaporator temperature is set. Deviation between the target evaporator temperature and actual evaporator temperature is calculated. Control coefficients are variably set according to the magnitude of the temperature deviation. A target control value of a pressure control valve of the swash-plate variable capacity compressor is calculated using the control coefficients. The pressure control valve is controlled by the target control value.

7 Claims, 6 Drawing Sheets

METHOD OF CONTROLLING AIR CONDITIONER FOR VEHICLES

CLAIM FOR PRIORITY

The present application is based on, and claims priority from, Korean Application Serial Number 10-2004-0084275, filed Oct. 21, 2004, and Korean Application Serial No. 10-2005-0096325, filed Oct. 13, 2005, both of which are hereby incorporated by reference herein in their entirety.

TECHNICAL FIELD

The present invention relates to a method of controlling air conditioner for vehicles, and more specifically to a method of controlling air conditioner for vehicles, wherein the target control value of the pressure control valve which controls tilt angle of a swash-plate of a swash-plate type variable capacity compressor is variably controlled according to the temperature deviation between target evaporator temperature and actual evaporator temperature, thereby efficiently controlling the discharge capacity of the compressor.

BACKGROUND ART

In a typical swash-plate type variable capacity compressor, the tilt angle of a swash-plate can be controlled by the change in the pressure of the refrigerant which is controlled by the pressure control valve depending on the thermal load. By controlling the tilt angle of a swash-plate, the stroke distance of the piston is changed thereby changing the discharge capacity of refrigerant and thus controlling the temperature of an evaporator.

The pressure control valve can be either internal-controlling type or external-controlling type, and a typical structure of swash-plate type variable capacity compressor is disclosed in Japanese laid open patent application No. 2001-107854.

The output to the pressure control valve (duty: current value) can be controlled by calculating the deviation between the target evaporator temperature and actual evaporator temperature and carrying out proportional-integral (PI) control based on this deviation. For example, Japanese laid open patent application No. 2003-200730 discloses a method of controlling air conditioner wherein proportional-integral control is carried out when the deviation between the target evaporator temperature and actual evaporator temperature is less than 3° C., maximum capacity control is carried out when the actual evaporator temperature is higher than the target evaporator temperature by not less than 3° C., and minimum capacity control is carried out when the actual evaporator temperature is lower than the target evaporator temperature by not less than 3° C.

In carrying out proportional-integral control by feedbacking actual evaporator temperature to the target evaporator temperature, the temperature controlling performance, i.e. the temperature convergence and response time, depends on how properly the proportional gain and integral gain is set depending on the system. When gain becomes larger, response time is shortened but system stability can be deteriorated due to excessive occurrence of overshoot and undershoot. On the contrary, when gain becomes smaller, temperature convergence is enhanced but the time for stabilization becomes longer.

From these points, the method of prior arts carrying out maximum or minimum capacity control with a predetermined fixed value even when the deviation between the target evaporator temperature and the actual evaporator temperature is over-higher or over-lower than a preferable value has the problem of causing instability in evaporator temperature and system.

DISCLOSURE OF THE INVENTION

One object of the invention is to provide a new and improved method of controlling air conditioner for vehicles wherein the target control value of the pressure control valve which controls tilt angle of a swash-plate of a swash-plate type variable capacity compressor is variably controlled according to the temperature deviation between target evaporator temperature and actual evaporator temperature, thereby efficiently controlling the discharge capacity of the compressor.

Another object of the invention is to provide a method of controlling air conditioner wherein the control coefficients, i.e. proportional gain and integral gain, are set to a large value, when the temperature deviation between target evaporator temperature and actual evaporator temperature is large in order to quickly reach the target evaporator temperature and the control coefficients are set to a small value, when the temperature deviation is small in order to stably reach the target evaporator temperature without fluctuation.

In order to accomplish the object of the present invention, the method of controlling air conditioner for a vehicle according to the present invention comprises the steps of setting a target evaporator temperature; determining the deviation between the target evaporator temperature and actual evaporator temperature; variably setting control coefficients as a proportional gain and an integral gain according to the magnitude of said temperature deviation; determining a target control value of the pressure control valve of the swash-plate type variable capacity compressor using said control coefficients; and controlling said pressure control valve by said target control valve.

The control coefficients are preferably set to have a value proportional to the absolute value of said temperature deviation, and the control coefficients are preferably set to a maximum value when the absolute value of said temperature deviation is larger than a predetermined value.

Additionally, the step of setting a target evaporator temperature preferably comprises setting a target interior temperature of a vehicle by a user, detecting and inputting interior and exterior temperature of the vehicle and solar radiation by using a sensor installed on the predetermined position of the vehicle, determining a target discharge temperature of a vent by using the target interior temperature, interior and exterior temperature of the vehicle and solar radiation, inputting a maximum evaporator temperature, setting a target evaporator temperature by comparing the target discharge temperature with the maximum evaporator temperature.

The method of the present invention may further comprises a step of determining the target heat amount of the vent after the step of inputting interior and exterior temperature of the vehicle and solar radiation by using a sensor installed on the predetermined position of the vehicle.

The step of inputting the maximum evaporator temperature preferably comprises calculating and inputting the maximum evaporator temperature depending on the temperature of the air flowing into the evaporator at the minimum operation of the compressor.

Also, the step of comparing the target discharge temperature with the maximum evaporator temperature preferably includes setting the target evaporator temperature to the target discharge temperature when the target discharge temperature is lower than the maximum evaporator temperature, and setting the target evaporator temperature to the maximum evaporator temperature when the target discharge temperature is higher than the maximum evaporator temperature.

BRIEF DESCRIPTION ON DRAWINGS

DESCRIPTION ON THE NUMERALS OF DRAWINGS

100: swash-plate type variable capacity compressor
160: pressure control valve
212, 214, 216: vent
310: sensor

MODE FOR INVENTION

The features and advantages of the present invention will now be described in detail with reference to the attached drawings in order to specifically clarify the invention. It should be appreciated that the terms and expressions used in the specification and drawing should be interpreted to comply with the technical ideas of the present invention under the principle that inventors can properly define concepts of terms to explain his invention best.

Figure 1:
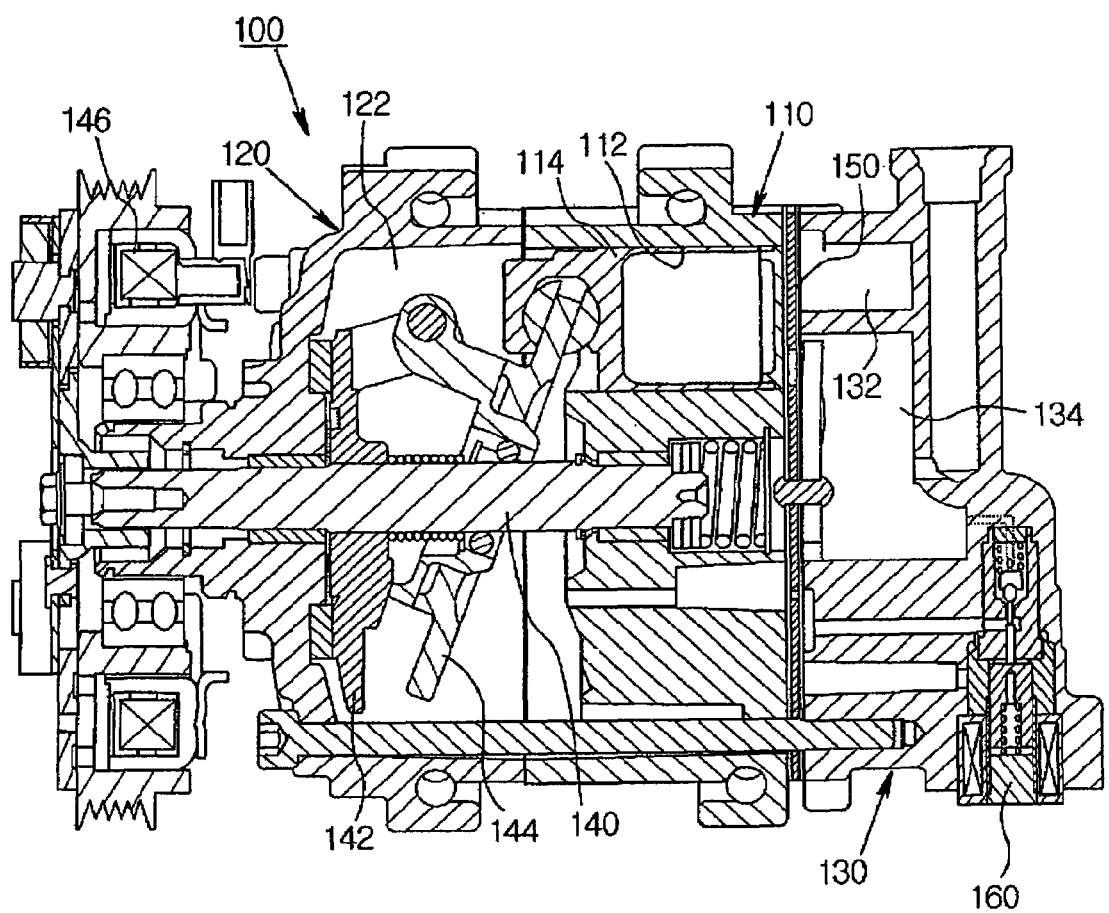
FIG. 1 is a cross-sectional view of one example of a swash-plate type variable capacity compressor.

FIG. 1 is an illustration of one example of a swash-plate type variable capacity compressor 100.

The swash-plate type variable capacity compressor 100, as illustrated in FIG. 1, comprises: a cylinder block 110 in which a plurality of cylinder bores 112 are formed in the radial direction along the coaxial circle; a plurality of pistons 114 inserted between the cylinder block 110 and cylinder bores 112; a front housing 120 which is connected to the front side of the cylinder block 110 and which forms a crank chamber 122 in it; a rear housing 130 which is connected to the rear side of the cylinder block 110 and which forms a refrigerant suction chamber 132 and refrigerant discharging chamber 134 in it; a driving shaft 140 supported across the cylinder block 110; a rotor 142 which rotates with the driving shaft 140 in the crank chamber 122; a swash-plate 144 which is movably installed around the driving shaft 140 and connected in the edge to the piston 114 in order to move the piston 114 in forward and backward direction and hinge-connected in one side of the edge to the rotor 142; a valve unit 150 which is interpositioned between the cylinder block 110 and rear housing 130 and which suctions refrigerant from the refrigerant suction chamber 132 to the cylinder bore 112 and discharges compressed refrigerant from the cylinder bores 112 to the refrigerant discharging chamber 134; a externally controlled pressure control valve 160 which is installed on the rear housing 130 in order to control the tilt angle of the swash-plate 144 against the driving shaft 140 by controlling the opening rate of the refrigerant returning passage connecting the refrigerant discharging chamber 134 to the crank chamber 122.

In the swash-plate type variable capacity compressor 100 as described above, a plurality of pistons 114 move in forward and backward direction sequentially by the wobbling rotation of the swash-plate 144. When the piston 114 moves backward from the cylinder bore 112 (suction stroke), suction side of the valve unit 150 is opened due to the decrease in pressure in the cylinder bore 112 connecting the cylinder bore 112 to the suction chamber and, thus, refrigerant is suctioned from the suction chamber to the cylinder bore 112. When the piston 114 moves forward to the cylinder bore 112 (compressing stroke), the refrigerant suctioned to the cylinder bore 112 is compressed due to the increase in pressure in the cylinder bore 112 and discharging side of the valve unit 150 is opened connecting the cylinder bore 112 to the refrigerant discharging chamber 134 and, thus, refrigerant is discharged from the cylinder bore 112 to the refrigerant discharge chamber 134. The pressure control valve 160 controls the tilt angle of the swash-plate 144 by controlling the opening rate of the refrigerant returning passage connecting the refrigerant discharge chamber 134 to the crank chamber 122 according to thermal load and, thus, controls the discharge capacity of the refrigerant. As the swash-plate 144 tilts to the driving shaft 140, the discharge capacity of the refrigerant increases due to the increase of the stroke distance of the piston 114.

Figure 2:
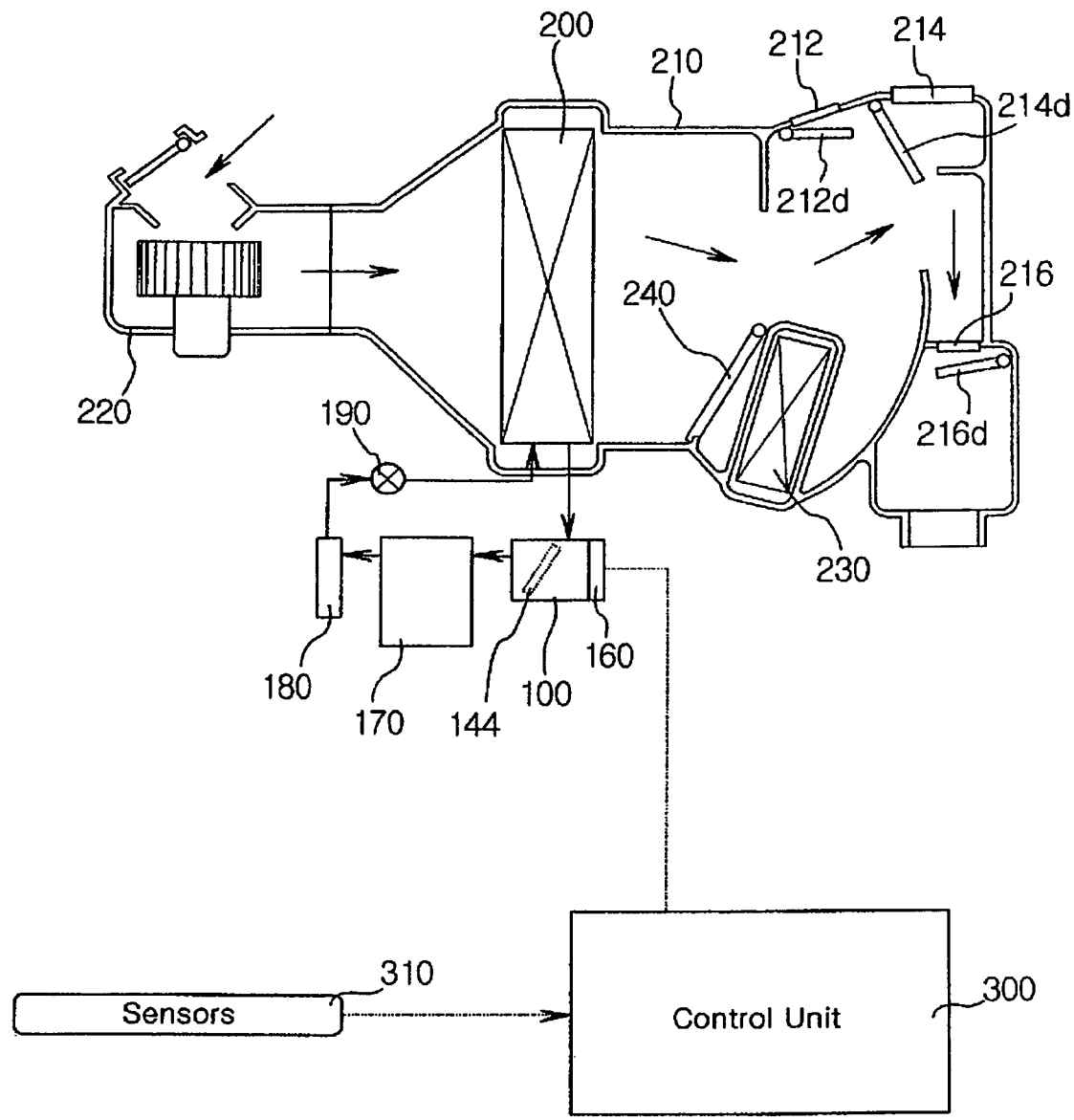
FIG. 2 is a diagram of a preferred embodiment of the structure of an air conditioner for carrying out the controlling method of the present invention.

FIG. 2 is an illustration of an air conditioner for vehicles equipped with the swash-plate type variable capacity compressor 100 as described above.

The air conditioner, as illustrated in FIG. 2, comprises an air conditioner case 210, a blower 220 installed on the entrance of the air conditioner case 210, an evaporator 200 and heater core 230 built in the air conditioner case 210, a temperature control door 240 which controls the opening rate of the passage of cooled and heated air passing the evaporator 200, a swash-plate type variable capacity compressor 100 which suctions refrigerant from the evaporator 200 and discharges, a condenser 170 which condenses and discharges the refrigerant supplied from the compressor 100, a receiver dryer 180 which separates the refrigerant supplied from the condenser 170 into gas and liquid, an expansion valve 190 which throttles the refrigerant supplied from the receiver dryer 180 and sends the refrigerant to the evaporator 200. The reference numeral 212, 214, 216 represents each vent and 212d, 214d, 216d represents control door which control corresponding vent 212, 214, 216, respectively.

The pressure control valve 160 which controls the discharge capacity of the compressor by controlling tilt angle of the swash-plate 144 is controlled its operational capacity by a control unit 300. More specifically, the control unit 300 controls the value of operational current to the control valve 160, and tilt angle of the swash-plate 144 against the driving shaft 140 is controlled by controlling the opening rate of the refrigerant returning passage connecting the refrigerant discharge chamber 134 to the crank chamber 122. As tilt angle becomes larger, the discharge capacity of the refrigerant increases.

In FIG. 2, unexplained numeral 310 represents various sensors such as the evaporator temperature sensor, interior temperature sensor, exterior temperature sensor and solar radiation sensor, and the signals detected by these sensors are input to the control unit 300.

In the following, the method of controlling air conditioner for vehicles according to a preferred embodiment of the present invention is described.

Figure 3:
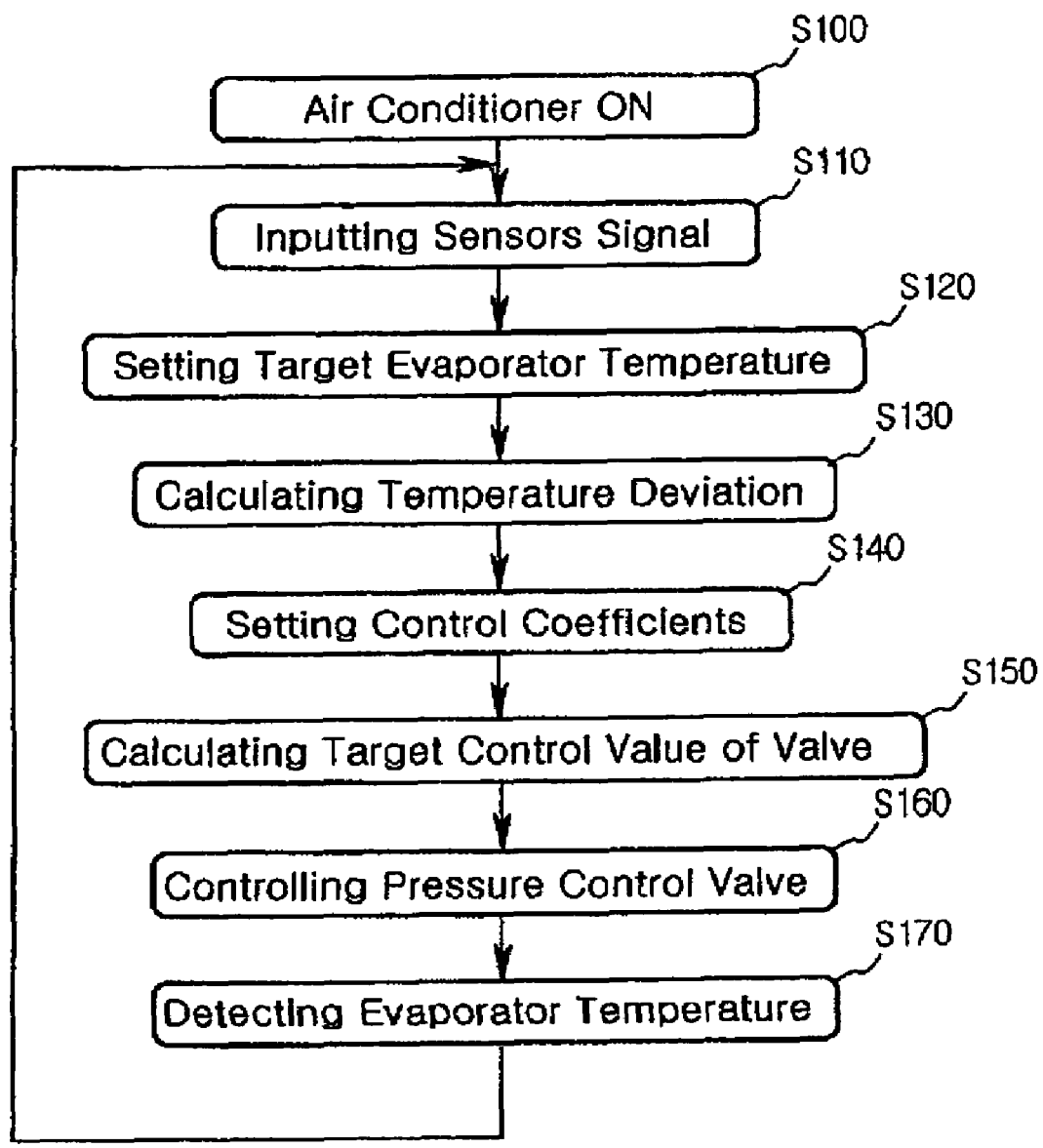
FIG. 3 is a flow chart illustrating the method of controlling an air conditioner for vehicles according to a preferred embodiment of the present invention.

As shown in FIG. 3, when air conditioner operates (S100), various signals detected by the sensors 310 are input to the control unit 300 (S110).

When signals are input from the sensors 310 to the control unit 300, a target evaporator temperature is set by the user (S120).

Figure 5:
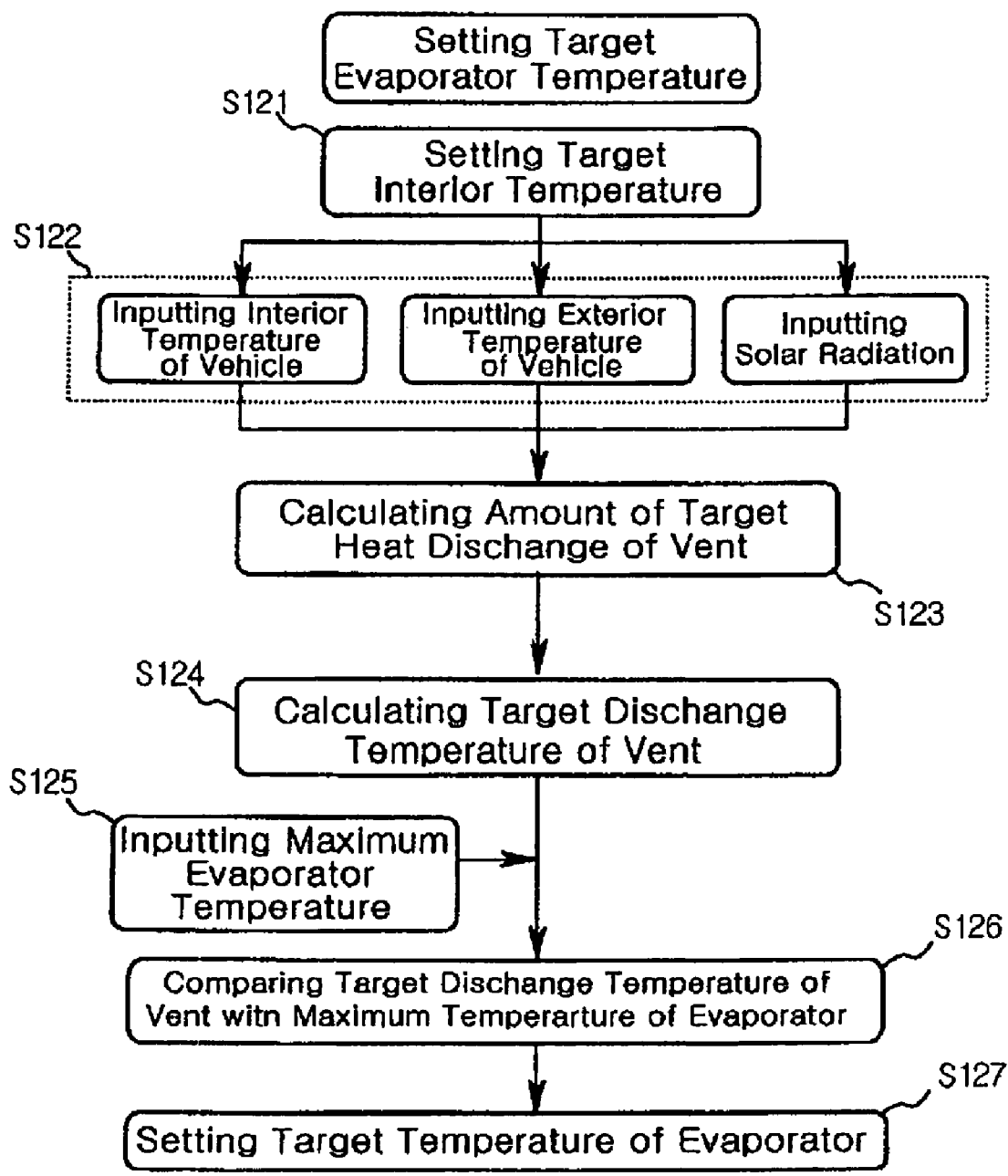
FIG. 5 is a flow chart of the method of setting the target evaporator temperature.

The target evaporator temperature can be set as follows: As shown in FIG. 5, target interior temperature is set by the user (S121). Next, interior and exterior temperatures of the vehicle and solar radiation are detected by using the sensors installed at predetermined positions of the vehicle and input to the control unit 300 (S122). Then, a target discharge temperature of the vents 212, 214, 216 is calculated by using the target interior temperature, interior and exterior temperature of the vehicle and solar radiation (S124). Then, a maximum evaporator temperature is input (S125). Then, the target evaporator temperature is set (S127) by comparing the target discharge temperature of the vents 212, 214, 216 with the maximum evaporator temperature (S126).

In the step of inputting the maximum evaporator temperature, it is preferable to calculate and input the maximum evaporator temperature depending on the temperature of the air flowing into the evaporator 200 at the minimum operation of the compressor.

In the step of comparing the target discharge temperature of the vents 212, 214, 216 with the maximum evaporator temperature in order to set target evaporator temperature, the target evaporator temperature is set to the target discharge temperature when the target discharge temperature is lower than the maximum evaporator temperature, and the target evaporator temperature is set to the maximum evaporator temperature when the target discharge temperature is higher than the maximum evaporator temperature.

The step of calculating the target heat discharge amount of the of the vents 212, 214, 216 (S123) can be added after the step of detecting and inputting interior and exterior temperature of the vehicle and solar radiation by using the sensors 310 installed at predetermined positions of the vehicle (S122), then target discharge temperature of the vent can be calculated (S124) by the target heat discharge amount of the of the vents 212, 214, 216.

After setting the target evaporator temperature in the manner described above, deviation between the target evaporator temperature and an actual evaporator temperature is calculated (S130).

The target evaporator temperature and the actual evaporator temperature may mean either the temperature of the air discharged through the evaporator or the temperature of the evaporator, and can be selected as needed.

Then, control coefficients are variably set according to the magnitude of said temperature deviation (S140).

The control coefficients are preferably proportional gain and integral gain.

When setting the control coefficients, the control coefficients, i.e. proportional gain and integral gain, are set to a large value, when the temperature deviation between target evaporator temperature and actual evaporator temperature is large in order to reach the target evaporator temperature quickly, and the control coefficients are set to a small value, when the temperature deviation is small in order to reach the target evaporator temperature stably without fluctuation.

Figure 4A:
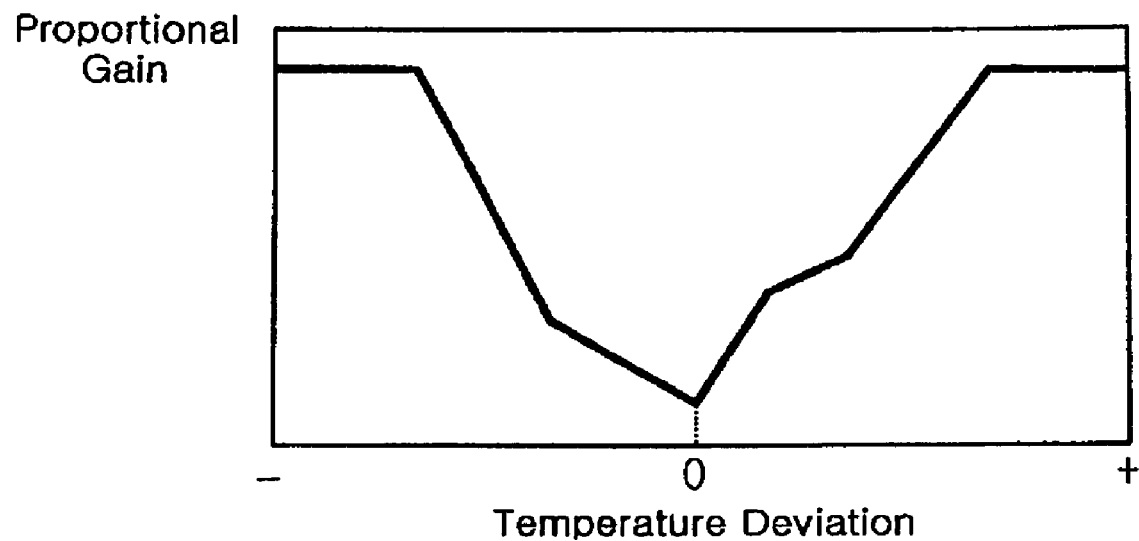
FIG. 4a is an illustration of the calculation step of FIG. 3 of proportional gain from the evaporator temperature deviations.
Figure 4B:
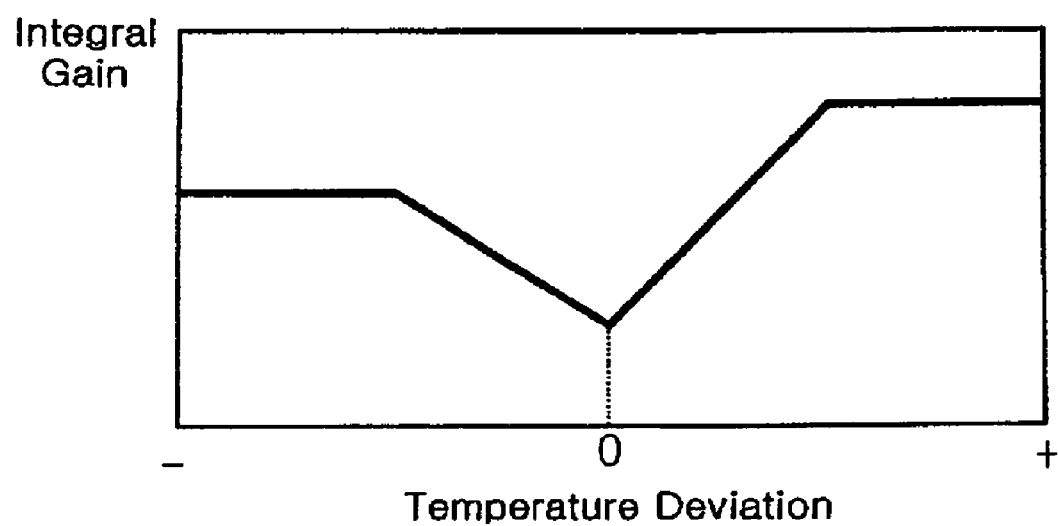
FIG. 4b is an illustration of the calculation step of FIG. 3 of integral gain from the evaporator temperature deviations.
Figure 4C:
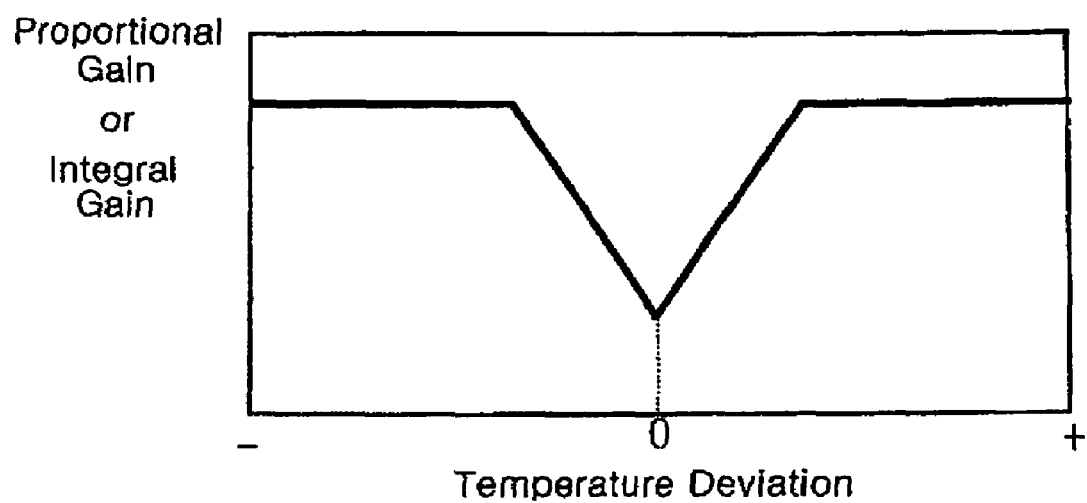
FIG. 4c is an illustration of the calculation step of FIG. 3 of proportional or integral gain from the evaporator temperature deviations.

One example of calculating proportional gain is illustrated in the graph of FIG. 4a and calculating integral gain is illustrated in the graph of FIG. 4b, which are examples of asymmetrically setting the proportional gain and integral gain. The proportional gain or integral gain can be set symmetrically as shown in FIG. 4c. In other words, the inclination of the control coefficients can be set to have a single value or combination of multiple values.

In setting the control coefficients, when the temperature deviation becomes larger in the direction of positive or negative direction on the basis of zero temperature deviation, the proportional or integral gain is set to become larger in proportion with the temperature deviation. In other words, the control coefficients are set to have a value proportional to the absolute value of the temperature deviation, and the control coefficients are set to a maximum value when the absolute value of said temperature deviation is larger than predetermined value.

Then, the control value (duty ratio: current value) of the pressure control valve 160 of the swash-plate type variable capacity compressor 100 is variably calculated using the control coefficients, i.e. proportional gain and integral gain (S150). The control value can be obtained by following formula:

$$\text{Duty}(n) = \text{Duty}(n-1)$$
$$-Gp\{\text{Evap\_error}(n) - \text{Evap\_error}(n-1)\} \quad \text{proportional control}$$
$$-Gi\{\text{Evap\_error}(n)\} \quad \text{integral control}$$

Here, the temperature deviation can be calculated by the formula $$\text{Evap\_error}(n) = \text{Tevap\_target} - \text{Tevap\_now}(n)$$

where Tevap_target is a target evaporator temperature, Tevap_now(n) is an actual evaporator temperature $n^{th}$ detected by an evaporator temperature sensor among the sensors 310, Duty(n) is output of $n^{th}$ pressure control valve 160, Gp is a proportional gain and Gi is an integral gain.

Then, the pressure control valve 160 of the swash-plate type variable capacity compressor 100 is controlled by the control value calculated as described above (S160). In short, the pressure control valve 160 is controlled by proportional-integral control until the actual evaporator temperature detected by the evaporator temperature sensor among the sensors 310 reaches the target evaporator temperature (S170).

INDUSTRIAL APPLICABILITY

According to the method of controlling air conditioner for vehicles which is performed as described above, the pressure control valve 160 is controlled through proportional and integral control by an output value obtained by applying variably and properly calculated proportional gain and integral gain in consideration with the temperature deviation between target evaporator temperature and actual evaporator temperature, procession history of the evaporator temperature and nonlinear characteristic of the compressor and air conditioning system. By using the method of the present invention, instability of the evaporator temperature and system can be reduced and convergence on the target evaporator temperature and responsibility can be enhanced.

What is claimed is:

1. A method of controlling an air conditioner for a vehicle having a swash-plate type variable capacity compressor comprising the steps of:

setting a target evaporator temperature;

determining temperature deviation between the set target evaporator temperature and actual evaporator temperature;

variably setting control coefficients as a proportional gain and an integral gain according to the magnitude of said temperature deviation, wherein the proportional gain and integral gain are set asymmetrically in a positive or negative direction on the basis of zero temperature deviation;

determining a target control value of a pressure control valve of the swash-plate type variable capacity compressor using said control coefficients; and controlling said pressure control valve by said target control value.

2. The method of claim 1, wherein said control coefficients are set to have a value proportional to the absolute value of said temperature deviation.

3. The method of claim 1, wherein said control coefficients are set to a maximum value when the absolute value of said temperature deviation is larger than a predetermined value.

4. The method of claim 1, wherein the step of setting the target evaporator temperature comprises:

setting a target interior temperature of a vehicle by a user, detecting and inputting interior and exterior temperatures of the vehicle and solar radiation by using a sensors installed at predetermined positions of the vehicle, determining a target discharge temperature of a vent by using the target interior temperature, interior and exterior temperature of the vehicle and solar radiation, inputting a maximum evaporator temperature, setting a target evaporator temperature by comparing the determined target discharge temperature of the vent with the maximum evaporator temperature.

5. The method of claim 4, wherein the step of inputting the maximum evaporator temperature comprises determining and inputting the maximum evaporator temperature depending on the temperature of air flowing into the evaporator at the minimum operation of the compressor.

6. The method of claim 4, wherein the step of comparing the target discharge temperature of the vent with the maximum evaporator temperature includes setting the target evaporator temperature to the target discharge temperature when the target discharge temperature is lower than the maximum evaporator temperature, and setting the target evaporator temperature to the maximum evaporator temperature when the target discharge temperature is higher than the maximum evaporator temperature.

7. The method of claim 4 further comprising the step of determining the amount of target heat discharge of the vent after the step of detecting and inputting interior and exterior temperature of the vehicle and solar radiation by using sensors installed at the predetermined positions of the vehicle.

* * * * *